(12) United States Patent
Srinivasan et al.

(10) Patent No.: US 12,445,679 B2
(45) Date of Patent: *Oct. 14, 2025

(54) METHODS AND APPARATUS TO VERIFY PRESENTATION OF MEDIA CONTENT

(71) Applicant: The Nielsen Company (US), LLC, New York, NY (US)

(72) Inventors: Venugopal Srinivasan, Tarpon Springs, FL (US); Arun Ramaswamy, Tampa, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/455,166

(22) Filed: Aug. 24, 2023

(65) Prior Publication Data
US 2023/0396840 A1 Dec. 7, 2023

Related U.S. Application Data

(63) Continuation of application No. 17/359,097, filed on Jun. 25, 2021, now Pat. No. 11,778,268, which is a (Continued)

(51) Int. Cl.
H04N 21/436 (2011.01)
G06F 21/62 (2013.01)
H04H 60/31 (2008.01)
H04N 7/16 (2011.01)
H04N 21/422 (2011.01)
H04N 21/439 (2011.01)
H04N 21/442 (2011.01)
H04N 21/466 (2011.01)

(52) U.S. Cl.
CPC .... *H04N 21/44204* (2013.01); *G06F 21/6245* (2013.01); *H04H 60/31* (2013.01); *H04N 7/163* (2013.01); *H04N 21/42203* (2013.01); *H04N 21/43615* (2013.01); *H04N 21/4394* (2013.01); *H04N 21/4396* (2013.01); *H04N 21/44213* (2013.01); *H04N 21/4667* (2013.01)

(58) Field of Classification Search
CPC ....... H04N 21/42201; H04N 21/42203; H04N 21/4223; H04N 21/4394; H04N 21/44008; H04N 21/4402
See application file for complete search history.

(56) References Cited

U.S. PATENT DOCUMENTS

| 2007/0061830 | A1* | 3/2007 | Chang | H04N 7/163 725/9 |
| 2008/0218583 | A1* | 9/2008 | Girish | H04N 7/147 348/E7.083 |

* cited by examiner

Primary Examiner — Rong Le

(57) ABSTRACT

Example methods and apparatus to verify presentation of media content are disclosed. A disclosed example apparatus for generating media presentation information includes a comparator to periodically output a value indicative of whether media selected via a set-top box is presented at a media presentation location by comparing a first audio signal associated with the media to ambient audio received in the media presentation location via an audio system associated with a media presentation device. The example apparatus also includes a privacy protector to facilitate operation of the comparator by periodically preventing the comparator from receiving of the ambient audio. The example apparatus also includes a metering module to record presentation of the media based on the output.

20 Claims, 7 Drawing Sheets

Related U.S. Application Data continuation of application No. 16/671,946, filed on Nov. 1, 2019, now Pat. No. 11,070,874, which is a continuation of application No. 14/841,191, filed on Aug. 31, 2015, now Pat. No. 10,469,901, which is a continuation of application No. 12/505,966, filed on Jul. 20, 2009, now Pat. No. 9,124,769.

(60) Provisional application No. 61/110,274, filed on Oct. 31, 2008.

METHODS AND APPARATUS TO VERIFY PRESENTATION OF MEDIA CONTENT

CROSS-REFERENCE TO RELATED APPLICATIONS

This disclosure is a continuation of U.S. patent application Ser. No. 17/359,097, now U.S. Pat. No. 11,778,268, titled "Methods and Apparatus to Verify Presentation of Media Content," filed Jun. 25, 2021, which is a continuation of U.S. patent application Ser. No. 16/671,946, now U.S. Pat. No. 11,070,874, titled "Methods and Apparatus to Verify Presentation of Media Content," filed Nov. 1, 2019, which is a continuation of U.S. patent application Ser. No. 14/841,191, now U.S. Pat. No. 10,469,901, titled "Methods and Apparatus to Verify Presentation of Media Content," filed Aug. 31, 2015, which is a continuation of U.S. patent application Ser. No. 12/505,966, now U.S. Pat. No. 9,124,769, titled "Methods and Apparatus to Verify Presentation of Media Content," filed Jul. 20, 2009, which claims the benefit of U.S. Provisional Patent Application No. 61/110,274, titled "Methods and Apparatus to Monitor Media Content," and filed Oct. 31, 2008. U.S. patent application Ser. No. 17/359,097, U.S. patent application Ser. No. 16/671,946, U.S. patent application Ser. No. 14/841,191, U.S. patent application Ser. No. 12/505,966, and U.S. Provisional Patent Application No. 61/110,274 are hereby incorporated by reference in their entireties.

FIELD OF THE DISCLOSURE

This disclosure relates generally to media content and, more particularly, to methods and apparatus to verify presentation of media content.

BACKGROUND

In audience measurement applications, determining the media content being presented by a media presentation device (e.g., a television program being displayed on a television) can be accomplished by, for example, monitoring the audio emanating from the media presentation device. If the presented media content includes watermarks, codes, or other identifiers embedded in the content, then extracting the identifier(s) facilitates the detection of program information. An alternative to this "active" approach is a "passive" technique based on computed fingerprints or signatures. Signatures are unique or semi-unique representations of media content segments derived from one or more of the properties of the media content signal, such as its local frequency distribution. Signature methods require reference signatures for all possible media content of interest. By comparing signatures derived from media content presented by a media presentation device (e.g., a home television set) with the reference signatures, the media content (e.g., a television program) being presented by the media presentation device can be identified.

Persons subscribing to cable, Internet protocol (IP), wireless and/or satellite content distribution services often receive media content signals via, for example, a set top-box (STB) installed by a service provider and/or a user. An example STB can determine, log and/or report information about media content (e.g., channels) tuned to and/or selected via user controls, such as a remote control. This media content information may be transmitted back to the service provider and/or an audience measurement entity via a back channel. By analyzing such information from one or more customer premises, ratings information and/or media consumption statistics can be determined.

DESCRIPTION

Example methods and apparatus to verify presentation of media content are disclosed. A disclosed example apparatus for use with a set-top box (STB) and a media presentation device includes an audio input interface to receive a first audio signal associated with a program selected by a user via the STB, a microphone to receive a free-field radiating second audio signal output by at least one of the media presentation device or an audio system associated with the media presentation device, a comparator to compare the second audio signal to the first audio signal to form an output, and an output interface to provide a value indicative of whether the program selected by the user via the STB is presented at the media presentation device.

Another disclosed example apparatus for use with a STB and a media presentation device a transducer to receive a free-field radiating first audio signal output by at least one of the media presentation device or an audio system associated with the media presentation device, a filter having adaptive weights to receive a second audio signal associated with a program selected by a user from an audio output line of the STB, and to process the second audio signal to generate a delayed and attenuated third audio signal, a difference detector to subtract the third audio signal from the first audio signal to form a residual signal, and a comparator to form a value indicative of whether the program selected by the user via the STB is presented at the media presentation device.

A disclosed example method to verify presentation at a media presentation device of media content selected at a tuning device includes receiving a first audio signal associated with the media content received at the tuning device, receiving a free-field radiating second audio signal output by the media presentation device, comparing the second audio signal to the first audio signal to form an output, and providing a value indicative of whether the media content received by the tuning device was presented at the media presentation device.

Figure 1:
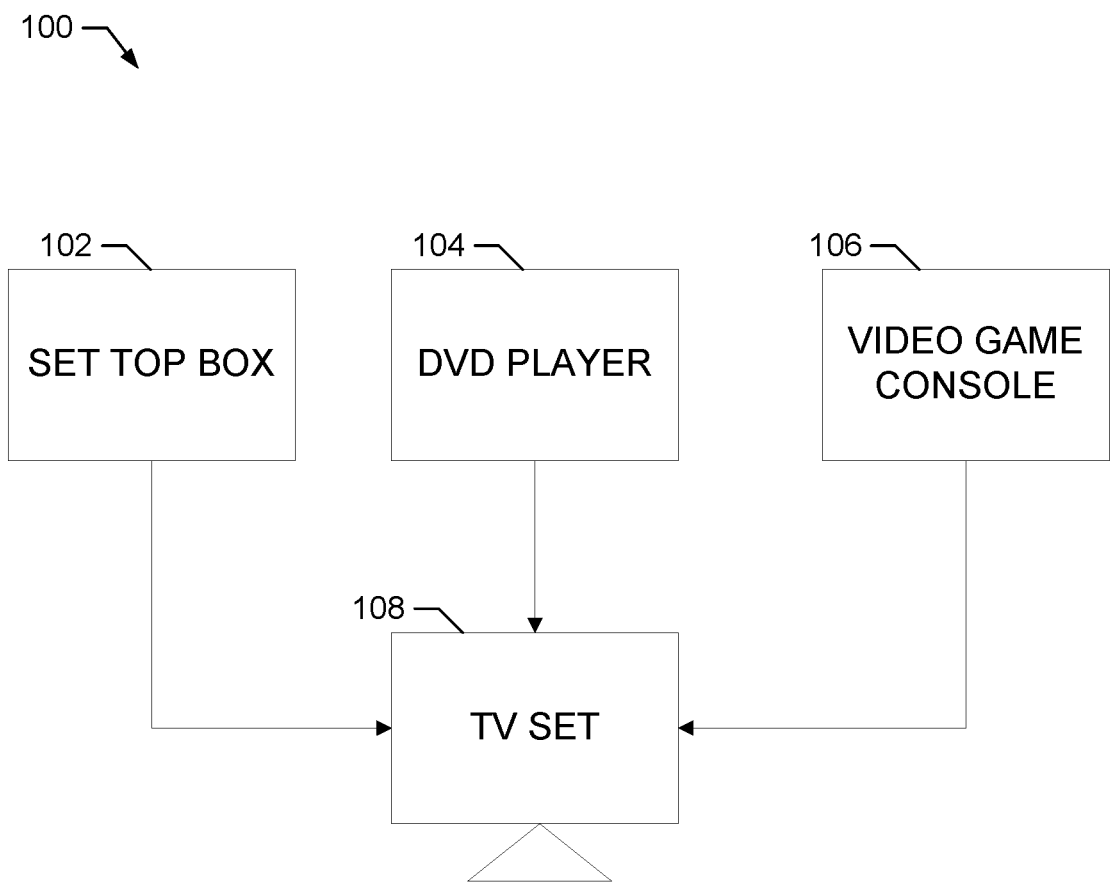
FIG. 1 is a block diagram of an example home entertainment system.

FIG. 1 is a block diagram of an example prior-art home entertainment system 100 that includes a STB 102, a digital versatile disk (DVD) player 104, a video game console 106, and a television 108. While a user may turn on the example STB 102 and select a particular media content channel and/or program, the television 108 may be set to display different media content output by the DVD player 104 and/or the video game console 106. Thus, even when the STB 102 is configured to tune and/or to receive a specific channel and/or media content, there is no guarantee that the television 108 connected to the STB 102 is set to actually use the STB 102 as its input source. Accordingly, the example STB 102 of FIG. 1 cannot determine and/or verify whether the television 108 is actually presenting the media content output by the STB 102.

Figure 2:
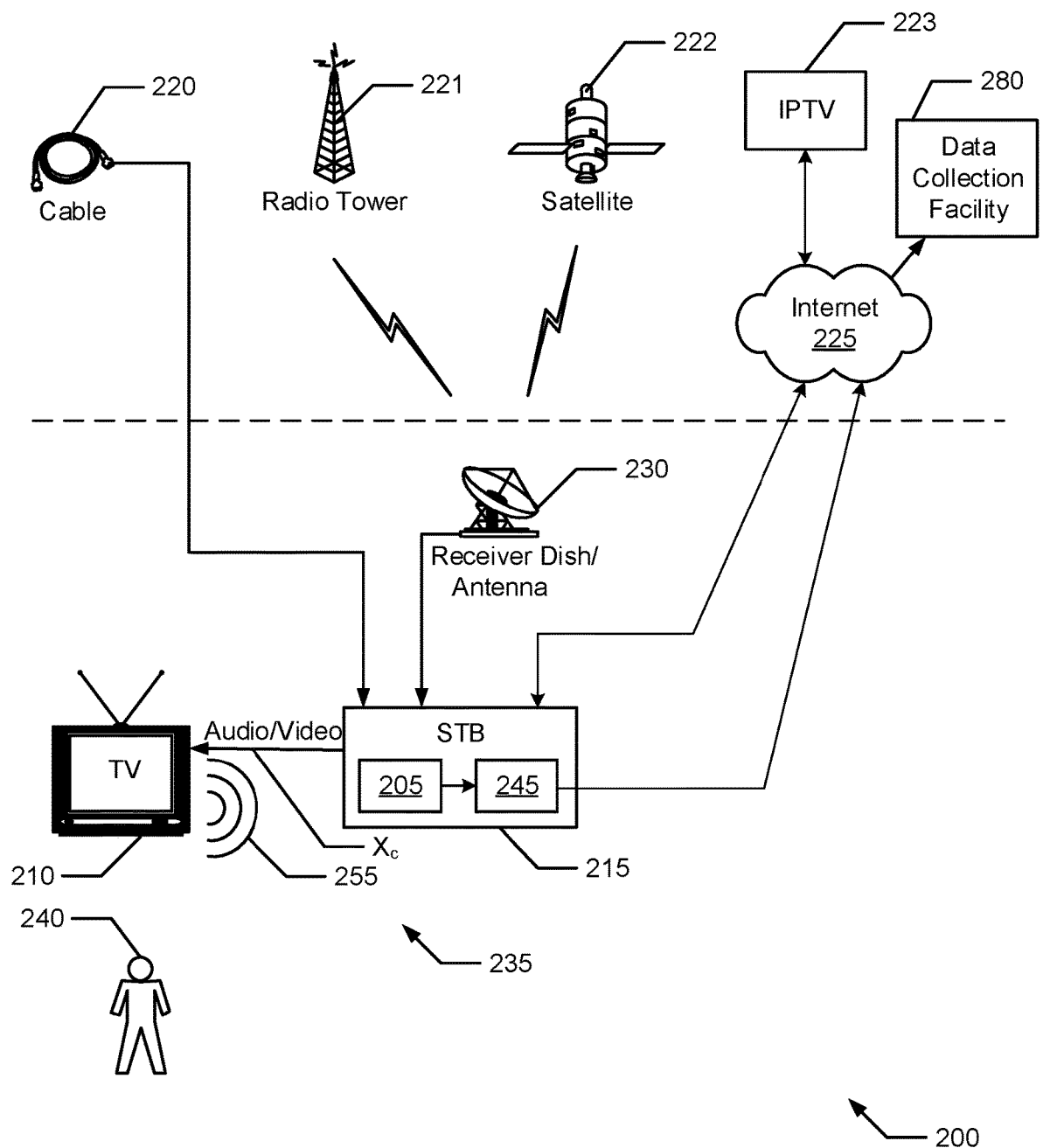
FIG. 2 is a block diagram of an example media content delivery system including a presentation verifier constructed in accordance with the teachings of this disclosure.

FIG. 2 illustrates an example media content delivery system 200 that includes a presentation verifier 205 to verify the presentation of media content by and/or at any number and/or type(s) of media presentation devices, one of which is designated at reference numeral 210. While for discussion purposes, the example media presentation device 210 of FIG. 2 is a television, the methods and apparatus described herein may be used to verify media content presentation by and/or at any other number and/or type(s) of media presentation devices. As described below in connection with FIGS. 3 and 4, the example presentation verifier 205 of FIG. 2 can be implemented by and/or within a tuning device 215, such as a STB, and/or may be implemented as a standalone device 400 (FIG. 4) placed and/or installed in-line between the example STB 215 and the example television 210. Moreover, while a STB is depicted in FIG. 2, any other number and/or type(s) of devices (e.g., a personal computer, a game console, a smart phone, a cellular phone, etc.) may, additionally or alternatively, be used to implement the tuning device 215.

Media content (e.g., television programs, movies, radio programs, videos, games, audio, etc.) may be provided to the STB 215 by any number and/or type(s) of service providers, four of which are designated at reference numerals 220, 221, 222 and 223. Example service providers 220-223 include, but are not limited to, a cable television based service provider 220, a cellular and/or wireless based service provider 221, a satellite based service provider 222, and/or an Internet protocol (IP) television (IPTV) based service provider 223. Media content received at the STB 215 may be encoded and/or formatted in accordance with any past, present and/or future standard, specification, format and/or recommendation, such as a National Television Standards Committee (NTSC) television signal format, a high definition television (HDTV) signal format, an Advanced Television Systems Committee (ATSC) television signal format, a phase alteration line (PAL) television signal format, a digital video broadcasting (DVB) television signal format, an Association of Radio Industries and Businesses (ARIB) television signal format, etc. Moreover, the example STB 215 of FIG. 2 may be communicatively coupled to the example service providers 220-223 via any number and/or type(s) of communication path(s), medium(s) and/or communication device(s). For example, the IPTV based service provider 223 may be communicatively coupled to the STB 215 via any public and/or private IP-based network, such as the Internet 225. The example cellular, wireless and/or satellite based service providers 221 and 222 may be communicatively coupled to the STB 215 via an antenna 230.

In the illustrated example of FIG. 2, the television 210 is located in a viewing area 235 within a customer premises occupied by one or more persons (also referred to herein as household member(s) 240), at least some of whom have agreed to participate in an audience measurement research study. The example viewing area 235 of FIG. 2 includes the area in which the television 210 is located and from which the television 210 may be viewed by the household member(s) 240 present in the viewing area 235.

To collect media content consumption, presentation and/or viewing information with respect to the household member(s) 240, the example STB 215 of FIG. 2 includes a metering module 245. The example metering module 245 of FIG. 2 provides collected media viewing, presentation and/or consumption information, as well as other tuning and/or demographic data, via, for example, the Internet 225 to a central data collection facility 280. The example data collection facility 280 of FIG. 2 processes and/or stores data received from the metering module 245, and/or similar devices in other viewing areas and/or at other customer premises, to produce ratings information and/or to develop meaningful content exposure statistics. For instance, the example data collection facility 280 can determine the overall effectiveness, reach and/or audience demographics of media content using any number and/or type(s) of statistical method(s). In some examples, the metering module 245 stores a log of audience measurement data and periodically (e.g., once a day) and/or aperiodically (e.g., upon occurrence of one or more events and/or conditions) sends the collected data to the data collection facility 280 for processing. Additionally or alternatively information associated with the presented media content and the household member(s) 240 may be provided to the data collection facility 280 in real-time or substantially real-time as the presentation of media content occurs.

The example metering module 245 of FIG. 2 interacts with any number and/or type(s) of tuners 305 (FIG. 3) implemented by and/or within the STB 215 to identify which media content is and/or has been received and/or tuned by the STB 215. Additionally or alternatively, the audience metering module 245 can identify the tuned and/or received media content from watermarks that have been embedded in the media content (e.g., any audio or video watermark) and/or based on computed and/or derived signatures (e.g., audio signatures, video signatures, etc.). However, as described above, such media content may not actually be presented by the television 210 even though tuned, received and/or output by the STB 215. For example, when the STB 215 is operating but the person 240 is playing a computer game via the television 210, media content received, tuned and/or output by the STB 215 is not actually presented to the person 240 and, thus, should not be recorded, logged and/or reported by the metering module 245 as having been presented.

To verify media content presentation, the example presentation verifier 205 of FIG. 2 compares audio data $X_c$ output and/or provided by the example STB 215 to the example television 210 with a free-field radiating audio signal 255 output by a speaker of the television 210 and/or by an audio system associated with the television 210. When the example presentation verifier 205 determines that the audio data $X_c$ output by the STB 215 substantially and/or sufficiently corresponds to the audio signal 255 presented by the audio equipment associated with the television 210, then the metering module 245 logs and/or reports the tuned and/or received media content as presented by the television 210. By verifying the presentation of media content, the accuracy of the audience measurement information reported and/or stored by the metering module 245 is improved and, accordingly, ratings information developed by the data collection facility 280 are more accurate and/or representative of actual audience behavior.

While the example components shown in FIG. 2 are depicted as separate structures within the media content delivery system 200, the functions performed by these components may be integrated within a single unit or may be implemented as two or more separate components. For example, although the television 210 and the STB 215 are depicted as separate devices, the television 210 and the STB 215 may be implemented in a single unit. In other examples, the STB 215, the metering module 245 and the presentation verifier 205 may be implemented as physically separate devices communicatively coupled via one or more cables. In still other examples, the television 210, the STB 215, the metering module 245, and the presentation verifier 205 are implemented in a single unit.

Figure 3:
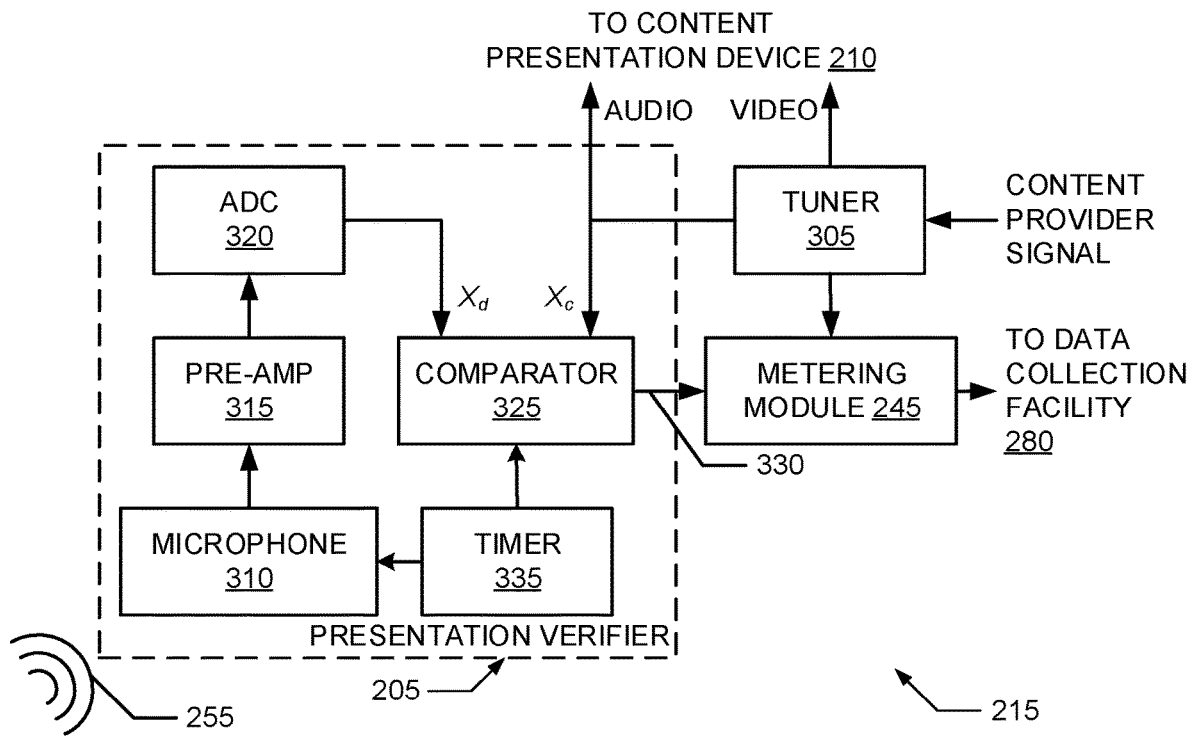
FIG. 3 illustrates an example manner of implementing the example presentation verifier and/or, more generally, the example STB of FIG. 2.

FIG. 3 illustrates an example manner of implementing the example presentation verifier 205 and/or, more generally, the example STB 215 of FIG. 2. In the example of FIG. 3, the tuner 305, the metering module 245 and the presentation verifier 205 are implemented in, by and/or together with the STB 215. The example tuner 305 of FIG. 3 receives media content signals from one or more of the example service providers 220-223 of FIG. 2. Based on user inputs, the example tuner 305 tunes to and/or otherwise obtains media content selected by a user of the STB 215, and outputs corresponding audio and/or video portions of the media content to the attached media content presentation device 210. As illustrated in FIG. 3, the audio portion of the media content is also provided to a comparator 325.

To receive the free-field radiating audio signal 255 output by a speaker of the example television 210 and/or by an audio system associated with the television 210, the example presentation verifier 205 of FIG. 3 includes any type of microphone 310 (e.g., a transducer), any type of pre-amplifier 315 and any type of analog-to-digital converter (ADC) 320. The example microphone 310 of FIG. 3 converts the free-field radiating sound waves 255 into an electrical signal that is amplified by the example pre-amplifier 315 and converted to a stream of digital samples $X_d$ by the example ADC 320. In some examples, the microphone 310 is affixed to a side of the STB 215 and picks up audio 255 in the vicinity of the STB 215. Additionally or alternatively, the microphone 310 may be wired or wirelessly coupled to the STB 215 so that the microphone 310 can be placed in a desired location separate from the STB 215. In addition, the microphone 310 may be replaced by any other type of audio input. For example, the STB 215 may be attached to an audio output of the media presentation device 210, and/or a speaker and/or speaker wire of the media presentation device 210 or an audio system associated with the media presentation device 210. While not shown in FIG. 3, if the audio signal $X_c$ output by the tuner 305 is an analog signal, the audio signal $X_c$ is also converted to a stream of digital samples using an amplifier and ADC similar to the pre-amp 315 and the ADC 320, respectively. Accordingly, during the following discussion, $X_c$ will be used to refer to a stream of digital samples corresponding to the audio output by the tuner 305.

To compare the audio signal $X_c$ output by the tuner 305 to the digital representation $X_d$ of the audio signal 255 output by the television 210 and/or an audio system associated with the television 210, the example presentation verifier 205 of FIG. 3 includes the comparator 325. The example comparator 325 of FIG. 3 compares the two audio signals $X_d$ and $X_c$ to determine whether they have similarities. The example comparator 325 determines whether the audio signal $X_c$ received from the tuner 305 is present, albeit in a possibly modified form, in the audio signal $X_d$ received via the microphone 310. In other words, the comparator 325 determines whether the media content presentation device 210 attached to the STB 215 is presenting the media content tuned to and/or received via the STB 215 so that the audio signal $X_c$ associated with the media content is present in the ambient audio 255 at the location of the media content presentation device 210.

To compare the audio signals $X_c$ and $X_d$, the example comparator 325 of FIG. 3 applies a filter 505 (FIG. 5), which compensates for delay and/or attenuation present between audio signal $X_c$ and the audio signal $X_d$. When the coefficients of the filter 505 have been adapted to represent such delay and/or attenuation characteristics, the filtered audio signal $X_c$ will substantially match the audio signal $X_d$. How closely the filtered audio signal $X_c$ and the audio signal $X_d$ match can be determined by, for example, subtracting the filtered audio signal $X_c$ from the audio signal $X_d$ to form a residual signal. When they are substantially similar, the residual signal will have a small magnitude and/or small signal strength. Thus, by comparing the magnitude of the residual signal to a threshold, the example comparator 325 of FIG. 3 can determine whether the media content received and/or tuned by the tuner 305 was presented at the media presentation device 210. Additionally or alternatively, as described below in connection with FIG. 6, the coefficients of the filter 505 can be analyzed to determine whether the media content was presented. An example filter structure, commonly referred to in the industry as an echo canceller, that can be used to implement the example comparator 325 is described below in connection with FIG. 5.

When the example comparator 325 of FIG. 3 determines that the signals $X_d$ and $X_c$ correspond to the same media content (e.g., when the residual signal of the comparator 325 has a small magnitude), the example comparator 325 provides an indication 330 having a first value (e.g., TRUE or one) to the metering module 245 that the media content received and/or tuned via the tuner 305 was presented by and/or at the media presentation device 210. Otherwise, the example comparator 325 outputs the indication 330 having a second value (e.g., FALSE or zero) to the metering module 245 that the media content received and/or tuned via the tuner 305 was not presented by and/or at the media presentation device 210.

Based on the indication 330, the example metering module 245 determines whether media presentation information for the media content corresponding to the audio signal $X_c$ should be stored and/or provided to the data collection facility 280. The example metering module 245 may additionally store and/or transmit to the data collection facility 280 additional information about the currently tuned program. For example, the metering module 245 and/or the tuner 305 may extract metadata from the media content provider signal and/or metadata in a program guide and transmit the information together with an identification as to whether or not the media content presentation device 210 presented the media content. Accordingly, the STB 215 and/or the data collection facility 280 can determine what media content was tuned by the STB 215 and whether that media content was presented by the media content presentation device 210 attached to the STB 215. The STB 215 may associate the identification with a timestamp so that the information transmitted to the data collection facility 280 can be used to determine the time(s) that the media content was presented by the media content presentation device 210.

To protect the privacy of the household member(s) 240, the example presentation verifier 205 of FIG. 3 includes a timer 335. The example timer 335 periodically and/or aperiodically enables and disables the microphone 310, the pre-amp 315 and/or the ADC 320 such that the comparator 325 and/or, more generally, the example presentation verifier 205 operate in a burst mode. For example, the timer 335 may enable the microphone 310, for example, for three seconds to allow the comparator 325 to converge its filter coefficients and to make a determination whether the audio signal $X_d$ corresponds to the audio signal $X_c$. The timer 335 may then disable the microphone 310 for several seconds, before re-enabling the microphone 310. How often the microphone 310 is enabled may be selected based on a desired granularity of media content presentation information to be reported by the example metering module 245.

Figure 4:
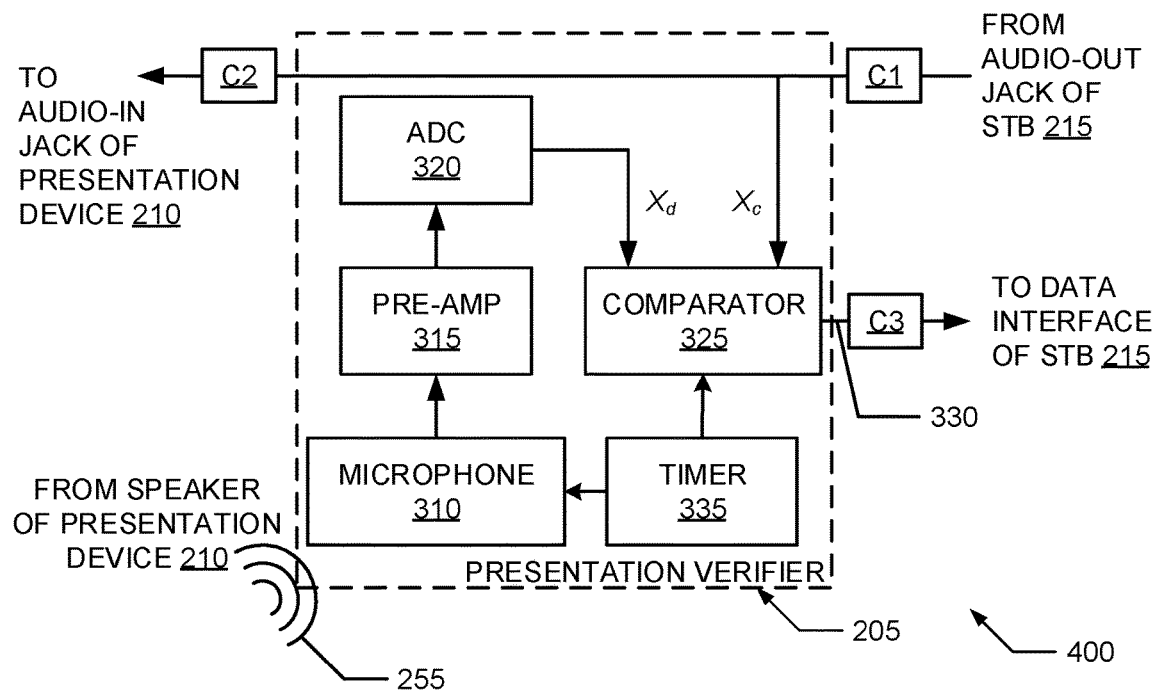
FIG. 4 illustrates an example standalone in-line presentation verification device that may be used to implement the example presentation verifier of FIG. 2.

FIG. 4 illustrates an example manner of implementing the example presentation verifier 205 of FIGS. 2 and 3 as a standalone in-line presentation verification device 400 that is user installable between the STB 215 and the television 210. That is, the example in-line presentation verification device 400 of FIG. 4 can be installed between the STB 215 and the television 210 at a time other than (e.g., after) when either the STB 215 or the television 210 were manufactured and/or assembled. Some components of the example in-line presentation verification device 400 of FIG. 4 are substantially similar or identical to those of FIG. 3. Accordingly, identical references numerals have been used in FIGS. 3 and 4 for identical components, and the interested reader is referred to the discussion presented above in connection with FIG. 3 for descriptions of the identically numbered components.

To allow the in-line presentation verification device 400 to be user and/or technician installed between the STB 215 and the media presentation device 210, the example in-line presentation verification device 400 of FIG. 4 includes connectors C1, C2 and C3. The example connector C1 of FIG. 1 is to electrically couple the audio signal $X_c$ from an audio-out jack and/or connector of the STB 215 to the comparator 325 via a first cable. As shown in FIG. 4, the audio signal $X_c$ received via the connector C1 is also passed through and output via the example connector C2. The example connector C2 of FIG. 4 is to electrically couple the audio signal $X_c$ to an audio-in jack and/or connector of the media presentation device 210 via a second cable. As illustrated in FIG. 4, the in-line presentation verification device 400 of FIG. 4 may be installed in-line between the audio-out jack of the STB 215 and the audio-in jack of the media presentation device 210. Example connectors that may be used to implement the connectors C1 and C2 include, but are not limited to, an RCA connector, a high-definition multimedia interface (HDMI) connector, a tip-sleeve (TS) connector and/or a tip-ring-sleeve (TRS) connector.

The media content presentation verification indications 330 determined by the comparator 325 are provided to the metering module 245 via the example connector C3. In some examples, the example connector C3 of FIG. 4 is a universal serial bus (USB) connector and a USB protocol and/or data signal is used to transfer the indication 330 from the comparator 325 to the metering module 245 and/or, more generally, to the example STB 215.

While example manners of implementing the example presentation verifier 205 of FIG. 2 have been illustrated in FIGS. 3 and 4, one or more of the interfaces, data structures, elements, processes and/or devices illustrated in FIGS. 3 and/or 4 may be combined, divided, re-arranged, omitted, eliminated and/or implemented in any other way. Further, the example tuner 305, the example metering module 245, the example presentation verifier 205, the example microphone 310, the example pre-amp 315, the example ADC 320, the example comparator 325, the example timer 335 and/or, more generally, the example STB 215 and the example in-line presentation verification device 400 of FIGS. 3 and 4, respectively, may be implemented by hardware, software, firmware and/or any combination of hardware, software and/or firmware. Thus, for example, any of the example tuner 305, the example metering module 245, the example presentation verifier 205, the example microphone 310, the example pre-amp 315, the example ADC 320, the example comparator 325, the example timer 335 and/or, more generally, the example STB 215 and the example in-line presentation verification device 400 may be implemented by one or more circuit(s), programmable processor(s), application-specific integrated circuit(s) (ASIC(s)), programmable logic device(s) (PLD(s)), field-programmable logic device(s) (FPLD(s)), and/or field-programmable gate array(s) (FPGA(s)), etc. When any claim of this patent incorporating one or more of these elements is read to cover a purely software and/or firmware implementation, at least one of the example tuner 305, the example metering module 245, the example presentation verifier 205, the example microphone 310, the example pre-amp 315, the example ADC 320, the example comparator 325, the example timer 335 and/or, more generally, the example STB 215 and the example in-line presentation verification device 400 are hereby expressly defined to include a tangible computer-readable medium. Example tangible computer-readable media include, but are not limited to, a flash memory, a compact disc (CD), a DVD, a floppy disk, a read-only memory (ROM), a random-access memory (RAM), a programmable ROM (PROM), an electronically-programmable ROM (EPROM), and/or an electronically-erasable PROM (EEPROM), an optical storage disk, an optical storage device, magnetic storage disk, a magnetic storage device, and/or any other tangible medium that can be used to store program code and/or instructions in the form of machine-readable instructions or data structures, and which can be accessed by a processor, a computer and/or other machine having a processor, such as the example processor platform P100 discussed below in connection with FIG. 9. Combinations of the above are also included within the scope of tangible computer-readable media. Further still, the example STB 215 and/or the example in-line presentation verification device 400 may include interfaces, data structures, elements, processes and/or devices instead of, or in addition to, those illustrated in FIGS. 3 and/or 4, and/or may include more than one of any or all of the illustrated interfaces, data structures, elements, processes and/or devices.

Figure 5:
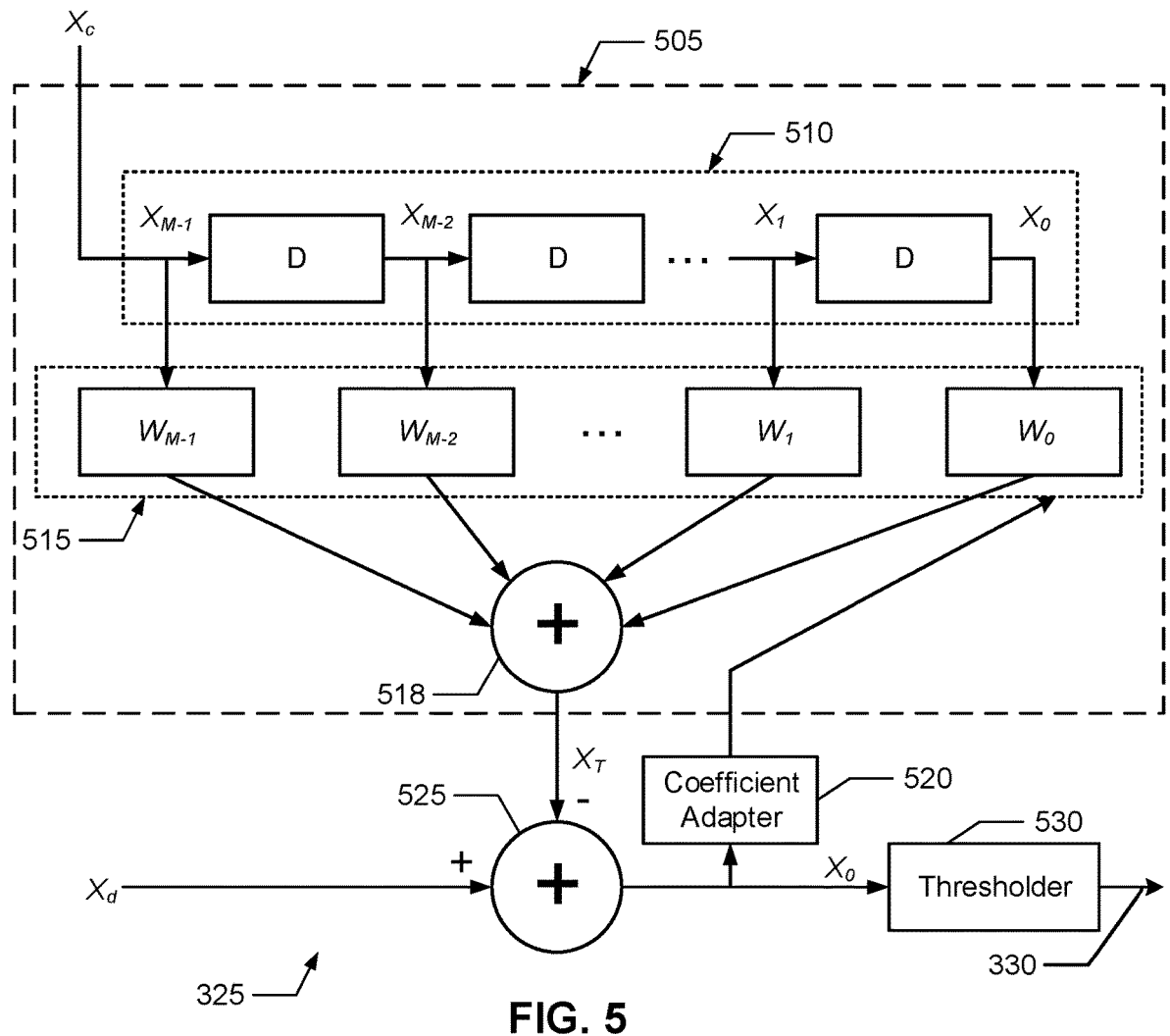
FIG. 5 illustrates an example manner of implementing the example comparators of FIGS. 3 and 4.

FIG. 5 illustrates an example manner of implementing the example comparator 325 of FIGS. 3 and 4. The example comparator 325 of FIG. 5 is configured as an echo canceller. Thus, the example comparator 325 operates to modify the audio signal $X_c$ that corresponds to the audio signal $X_d$ (if present) so that when the filtered version $X_T$ of the audio signal $X_c$ is subtracted from the audio signal $X_d$, the residual signal $X_O$ is minimized. Accordingly, when the audio signal $X_c$ substantially comprises a modified version of the audio signal $X_d$, the residual signal $X_O$ will be small.

Figure 6:
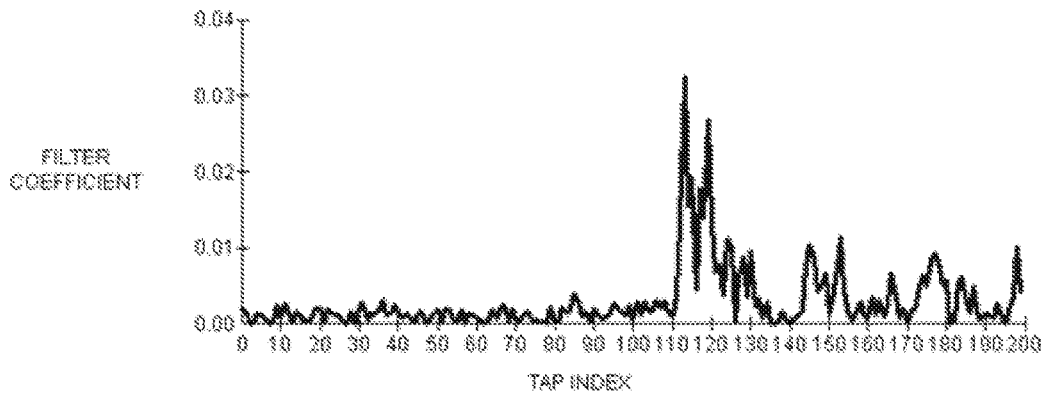
FIG. 6 illustrates an example filter coefficient magnitude distribution.

To form the estimate $X_T$ of the audio signal $X_d$ from the received audio signal $X_c$, the example comparator 325 of FIG. 5 includes a finite impulse response (FIR) filter 505. To compensate for audio propagation delays and/or multiple sound wave paths due to reflections off of walls and/or other objects in the viewing area 235, the example filter 505 includes a delay line 510 of M shift registers. To compensate for attenuation of the audio signal 255 during its propagation through the viewing area 235, the example filter 505 includes one or more filter coefficients 515. Filter coefficients may also be referred to as weights and/or filter taps. To adjust the audio signal $X_c$ so that the portion of the audio signal $X_c$ corresponds more closely with the audio signal $X_d$, the audio signal $X_c$ has to be delayed and attenuated, as shown in FIG. 1n the illustrated example of FIG. 5, the filter coefficient 515 with the largest magnitude corresponds to the delay that the audio $X_c$ is subjected-to in order to align itself with the microphone 310 detected audio signal $X_d$. In some examples, the distribution of the filter coefficients 515 may be configured to ensure that the coefficient with the maximum magnitude is significantly larger than the other coefficients. Accordingly, as shown in FIG. 6, the other coefficients 515 in the vicinity of the coefficient 515 with the maximum magnitude exhibit a decay characteristic. For convenience, only the first 200 of 400 taps are shown in the graph of FIG. 6. The maximum filter coefficient magnitude (in this example 0.033) is an indicator of the extent of attenuation that the audio signal $X_c$ has experienced between the internal tuner 305 and the microphone 310.

The output $X_T$ of the filter 505 is a summation of the weighted samples, which can be mathematically expressed as:

$$X_T = \sum_{m=0}^{m=M-1} W_m X_m, \quad \text{EQN (1)}$$

where $W_m$ are the values of the filter coefficients 515. The values $X_m$ correspond to the differently delayed samples of the audio signal $X_c$ formed by the example delay line 510 of FIG. 5. To compute the sum of the weighted samples, the example comparator 325 of FIG. 5 includes any type of summer 518.

To adapt the filter coefficients 515, the example comparator 325 of FIG. 5 includes a coefficient adapter 520. The example coefficient adapter 520 adjusts the filter coefficients 515 to minimize the difference $X_0$ between the audio signal $X_d$ and the filtered audio signal $X_T$. That is, the coefficient adapter 520 operates to substantially minimize the residual signal $X_0$. In some example, the initial values of the filter coefficients 515 are set to zero when the microphone 310 is enabled. Additionally or alternatively, the values of the filter coefficients 515 can be frozen, fixed and/or retained while the microphone 310 is disabled. The example coefficients adjustor 520 adjusts the filter coefficients 515 by applying the following equation:

$$\boxed{\phantom{xxxxxxxxxxxxxxxxxxxxxxxxxxxxx}}, \quad \text{EQN (2)}$$

where the index n is an iteration index denoting the time in sample counts at which the coefficient updates are made and μ is a learning factor, which is usually set to a low value such as 0.05. The application of EQN (2) gradually minimizes the least mean squared (LMS) value of the residual error signal $X_0$.

To compute the error and/or residual signal $X_0$, the example comparator 325 of FIG. 5 includes a subtractor 525.

The example subtractor 525 generates the residual signal $X_0$ by subtracting the filtered signal $X_T$ from the audio signal $X_d$.

An example implementation uses a 16 kHz sampling rate (any desired sampling rate may be used) and uses M=400 filter coefficients 515 $W_0$ through $W_{M-1}$, supporting a maximum time delay of 25 milliseconds between the audio signal $X_c$ and the audio signal $X_d$. If the audio $X_d$ picked up by the microphone 310 predominantly corresponds to the audio signal $X_c$, the filter weights 515 readily adapt themselves to substantially stationery values and the error signal $X_0$ decreases to a low value in approximately one second. The extent to which the residual signal $X_0$ is not zero may depend on any number and/or type(s) of factors, such as the presence of ambient noise in the viewing area 235, quantization noise, computation noise, finite-precision arithmetic effects, etc. When the audio $X_d$ is different from the audio $X_c$, the adaptation process will not be able to substantially reduce and/or minimize the error signal $X_0$. Therefore, by comparing the error signal $X_0$ energy with a threshold (e.g., a predetermined threshold), the comparator 325 can determine whether the audio 255 emanating from the speakers matches the tuner audio $X_c$. When a good match is identified, the comparator 325 can also analyze the distribution of filter coefficients to determine whether one filter coefficient has a magnitude that is greater than all the other coefficients, as depicted in FIG. 6.

To compare the magnitude of the residual signal $X_0$ to a threshold, the example comparator 325 includes a thresholder 530. When the magnitude of the residual signal $X_0$ exceeds the threshold, the indication 330 has a first value (e.g., TRUE or one). When the magnitude of the residual signal $X_0$ does not exceed the threshold, the indication 330 has a different value (e.g., FALSE or zero).

While an example manner of implementing the example comparators 325 of FIGS. 3 and 4 has been illustrated in FIG. 5, one or more of the interfaces, data structures, elements, processes and/or devices illustrated in FIG. 5 may be combined, divided, re-arranged, omitted, eliminated and/or implemented in any other way. For example, the subtractor 525 and the filter 505 may be implemented in the same or separate integrated circuits. Further, the example filter 505, the example delay line 510, the example filter coefficients 515, the example summer 518, the example coefficient adapter 520, the example subtractor 525, the example thresholder 530 and/or, more generally, the example comparator 325 of FIG. 5 may be implemented by hardware, software, firmware and/or any combination of hardware, software and/or firmware. Thus, for example, any of the example filter 505, the example delay line 510, the example filter coefficients 515, the example summer 518, the example coefficient adapter 520, the example subtractor 525, the example thresholder 530 and/or, more generally, the example comparator 325 may be implemented by one or more circuit(s), programmable processor(s), ASIC(s), PLD(s), FPLD(s), and/or FPGA(s), etc. When any claim of this patent incorporating one or more of these elements is read to cover a purely software and/or firmware implementation, at least one of the example filter 505, the example delay line 510, the example filter coefficients 515, the example summer 518, the example coefficient adapter 520, the example subtractor 525, the example thresholder 530 and/or, more generally, the example comparator 325 are hereby expressly defined to include a tangible computer-readable medium. Example tangible computer-readable media include, but are not limited to, a flash memory, a CD, a DVD, a floppy disk, a ROM, a RAM, a PROM, an EPROM, and/or an EEPROM, an optical storage disk, an optical storage device, magnetic storage disk, a magnetic storage device, and/or any other tangible medium that can be used to store program code and/or instructions in the form of machine-readable instructions or data structures, and which can be accessed by a processor, a computer and/or other machine having a processor, such as the example processor platform P100 discussed below in connection with FIG. 9. Combinations of the above are also included within the scope of tangible computer-readable media. Further still, the example comparator 325 may include interfaces, data structures, elements, processes and/or devices instead of, or in addition to, those illustrated in FIG. 5, and/or may include more than one of any or all of the illustrated interfaces, data structures, elements, processes and/or devices.

Figure 7:
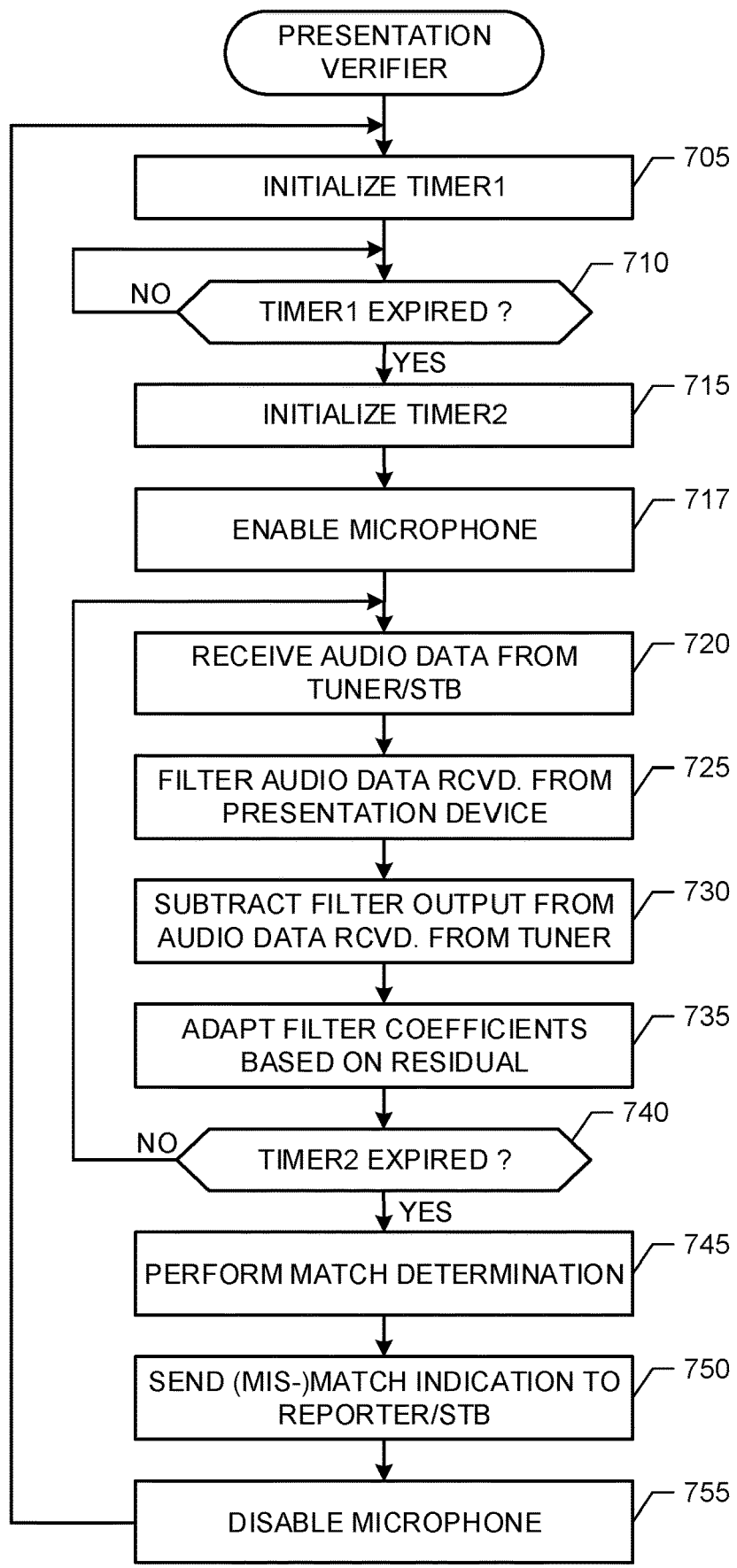
FIG. 7 is a flowchart representative of example machine-accessible instructions that may be executed by, for example, a processor to implement the example presentation verifiers of FIGS. 2, 3 and/or 4.
Figure 8:
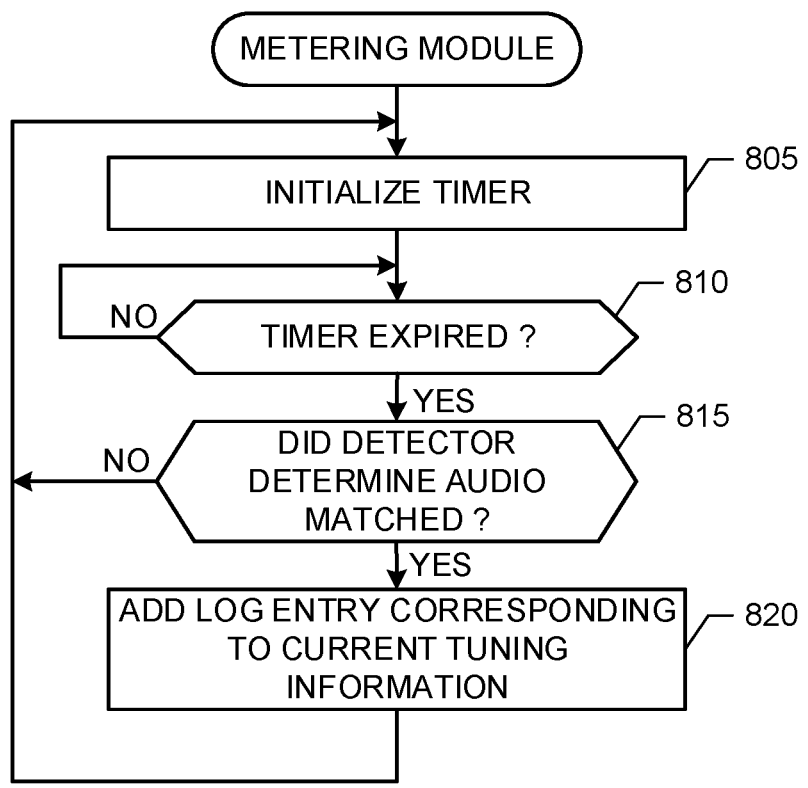
FIG. 8 is a flowchart representative of example machine-accessible instructions that may be executed by, for example, a processor to implement the example metering module of FIGS. 2 and 3.

FIG. 7 illustrates example machine-accessible instructions that may be executed to implement the example presentation verifier 205 of FIGS. 2-4. FIG. 8 illustrates example machine-accessible instructions that may be executed to implement the example metering module 245 of FIGS. 2 and 3. A processor, a controller and/or any other suitable processing device may be used and/or programmed to execute the example machine-accessible instructions of FIGS. 7 and 8. For example, the machine-accessible instructions of FIGS. 7 and 8 may be embodied in coded instructions stored on a tangible computer-readable medium such as a flash memory, a CD, a DVD, a floppy disk, a ROM, a RAM, a PROM, an EPROM, and/or an EEPROM, an optical storage disk, an optical storage device, magnetic storage disk, a magnetic storage device, and/or any other tangible medium that can be used to store program code and/or instructions in the form of machine-readable instructions or data structures, and which can be accessed by a processor, a computer and/or other machine having a processor, such as the example processor platform P100 discussed below in connection with FIG. 9. Combinations of the above are also included within the scope of computer-readable media. Machine-readable instructions comprise, for example, instructions and data that cause a processor, a computer and/or a machine have a processor to perform one or more particular processes. Alternatively, some or all of the example machine-accessible instructions of FIGS. 7 and 8 may be implemented using any combination(s) of ASIC(s), PLD(s), FPLD(s), FPGA(s), discrete logic, hardware, firmware, etc. Also, some or all of the example processes of FIGS. 7 and 8 may be implemented manually or as any combination of any of the foregoing techniques, for example, any combination of firmware, software, discrete logic and/or hardware. Further, many other methods of implementing the example operations of FIGS. 7 and 8 may be employed. For example, the order of execution of the blocks may be changed, and/or one or more of the blocks described may be changed, eliminated, sub-divided, or combined. Additionally, any or all of the example machine-accessible instructions of FIGS. 7 and 8 may be carried out sequentially and/or carried out in parallel by, for example, separate processing threads, processors, devices, discrete logic, circuits, etc.

The example machine-accessible instructions of FIG. 7 begin with the example timer 335 of FIG. 3 initializing a first timer duration TIMER1 (block 705). When the first timer duration TIMER1 expires (block 710), the example timer 335 initializes a second timer duration TIMER2 (block 715) and enables the microphone 310 (block 717).

The example delay line 510 (FIG. 5) receives one or more samples of the audio signal $X_c$ from the STB 215 (block 720). The example filter coefficients 515 are applied to the updated delay line 510 to form one or more updated samples of the estimate $X_T$ (block 725). The example subtractor 525 subtracts the updated estimates $X_T$ from one or more new samples of the audio signal $X_d$ to form one or more new samples of the residual signal $X_0$ (block 730). The example coefficient adapter 520 updates the filter coefficients 515 based on the new residual sample values $X_0$ (block 735).

If the second timer duration TIMER2 has not yet expired (block 740), control returns to block 720 to continue processing samples of the audio signals $X_c$ and $X_d$, and updating the filter coefficients 515.

When the second timer duration TIMER expires (block 740), the example thresholder 530 compares a magnitude of the residual signal $X_0$ to a threshold (block 745). As described above, based on the comparison, the example comparator 325 sends an indication 330 representative of whether the media content corresponding to the audio signal $X_c$ was presented at and/or by the media presentation device 210 (block 750). The timer 335 disables the microphone 310 (block 755) and control returns to block 705 to wait for the timer duration TIMER1 to expire again.

The example machine-accessible instructions of FIG. 8 begin with the example metering module 245 initializing a timer with a duration of TIMER (block 805). When the timer expires (block 810), the metering module 245 determines whether the indication 330 indicates that the media content corresponding to the audio signal $X_c$ was presented at the media presentation device (block 815). If the indication 330 indicates that the media content corresponding to the audio signal $X_c$ was presented at the media presentation device (block 815), the metering module 245 adds a log entry corresponding to the current media content being presented (block 820). A log entry may include any desired data such as a timestamp, a program identifier, an audio and/or video code that was embedded in the media signal, a signature of the media signal, a station identifier, metadata, etc. Control then returns to block 805.

If the indication 330 does not indicate that the media content corresponding to the audio signal $X_c$ was presented at the media presentation device (block 815), control returns to block 805 without adding a log entry.

Figure 9:
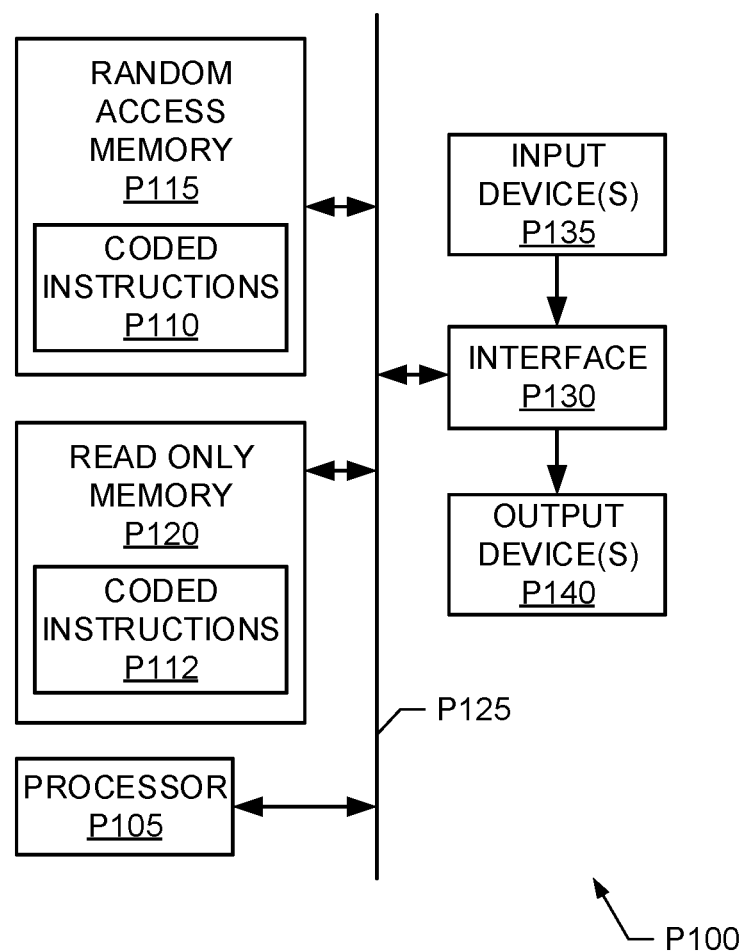
FIG. 9 is a block diagram of an example processor platform that may be used and/or programmed to carry out the example machine-accessible instructions of FIGS. 7 and 8, and/or to implement the example methods and apparatus to verify media content presentation described herein.

FIG. 9 is a schematic diagram of an example processor platform P100 that may be used and/or programmed to implement any of the example apparatus and/or methods to verify presentation of media content disclosed herein. For example, one or more general-purpose processors, processor cores, microcontrollers, etc can implement the processor platform P100.

The processor platform P100 of the example of FIG. 9 includes at least one programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example machine-accessible instructions of FIGS. 7 and 8 and/or, more generally, to implement the example presentation verifiers 205 and the example metering modules 245 described herein.

The processor P105 is in communication with any number and/or type(s) of tangible computer-readable storage media (including a ROM P120 and/or the RAM P115) via a bus P125. The RAM P115 may be implemented by dynamic random access memory (DRAM), synchronous dynamic random access memory (SDRAM), and/or any other type of RAM device, and ROM may be implemented by flash memory and/or any other desired type of memory device. Access to the memory P115 and the memory P120 may be controlled by a memory controller (not shown).

The processor platform P100 also includes an interface circuit P130. Any type of interface standard, such as an external memory interface, serial port, general-purpose input/output, etc, may implement the interface circuit P130. One or more input devices P135 and one or more output devices P140 are connected to the interface circuit P130. The input devices P135 may be used to implement the example microphone 310, the example pre-amp 315 and the example ADC 320. The output devices P140 may be used to send the indication 330 to the metering module 245 and/or the STB 215.

Although certain example methods, apparatus, and articles of manufacture have been described herein, the scope of coverage of this patent is not limited thereto. On the contrary, this patent covers all methods, apparatus, and articles of manufacture fairly falling within the scope of the appended claims either literally or under the doctrine of equivalents.

The invention claimed is:

1. A method comprising:
   obtaining, by a computing system, a first audio signal corresponding to media content output by a set-top box of a media presentation environment;
   selectively operating, by a timer of the computing system, a microphone in the media presentation environment to obtain a second audio signal representative of audio output by a speaker of a television, wherein selectively operating the microphone to obtain the second audio signal comprises selectively enabling and disabling the microphone for periods of time such that the second audio signal is obtained during one of the periods of time during which the microphone is enabled, wherein the periods of me are selected based on a predetermined desired granularity of media content presentation information to be reported by the computing system to an audience measurement data collection facility and are periods of time during which ambient audio is permitted to be captured from the media presentation environment so as to protect privacy of household members in the media presentation environment;
   determining, by the computing system, that the first audio signal corresponds to the second audio signal; and
   based on the determining, logging, by the computing system, the media content as presented by the television for reporting by the computing system.

2. The method of claim 1, wherein obtaining the first audio signal comprises obtaining the first audio signal from a tuner of the set-top box.

3. The method of claim 2, wherein obtaining the first audio signal comprises obtaining the first audio signal from a connector of the set-top box.

4. The method of claim 1, wherein determining that the first audio signal corresponds to the second audio signal comprises determining that the first audio signal is present in the second audio signal.

5. The method of claim 1, wherein determining that the first audio signal corresponds to the second audio signal comprises determining that the first audio signal and the second audio signal correspond to a same content item.

6. The method of claim 1, wherein logging the media content as presented by the television comprises storing media presentation information for the media content.

7. The method of claim 1, wherein the determining that the first audio signal corresponds to the second audio signal is performed by a comparator of the computing system, and wherein selectively operating the microphone causes the comparator to operate in a burst mode.

8. A computing system comprising a microphone and a timer, the computing system configured to perform a set of acts comprising:
   obtaining a first audio signal corresponding to media content output by a set-top box of a media presentation environment;
   selectively operating, by the timer of the computing system, the microphone in the media presentation environment to obtain a second audio signal representative of audio output by a speaker of a television, wherein selectively operating the microphone to obtain the second audio signal comprises selectively enabling and disabling the microphone for periods of time such that the second audio signal is obtained during one of the periods of time during which the microphone is enabled, wherein the periods of time are selected based on a predetermined desired granularity of media content presentation information to be reported by the computing system to an audience measurement data collection facility and are periods of time during which ambient audio is permitted to be captured from the media presentation environment so as to protect privacy of household members in the media presentation environment;
   determining that the first audio signal corresponds to the second audio signal; and
   based on the determining, logging the media content as presented by the television for reporting by the computing system.

9. The computing system of claim 8, wherein obtaining the first audio signal comprises obtaining the first audio signal from a tuner of the set-top box.

10. The computing system of claim 9, wherein obtaining the first audio signal comprises obtaining the first audio signal from a connector of the set-top box.

11. The computing system of claim 8, wherein determining that the first audio signal corresponds to the second audio signal comprises determining that the first audio signal is present in the second audio signal.

12. The computing system of claim 8, wherein determining that the first audio signal corresponds to the second audio signal comprises determining that the first audio signal and the second audio signal correspond to a same content item.

13. The computing system of claim 8, wherein logging the media content as presented by the television comprises storing media presentation information for the media content.

14. The computing system of claim 8, further comprising a comparator,
   wherein the determining that the first audio signal corresponds to the second audio signal is performed by the comparator, and
   wherein selectively operating the microphone causes the comparator to operate in a burst mode.

15. A computing system comprising a microphone and a timer, the computing system configured to perform a set of acts comprising:
   obtaining a first audio signal corresponding to media content output by a set-top box of a media presentation environment; and
   selectively operating, by the timer of the computing system, the microphone to periodically obtain second audio signals representative of audio output by a speaker of a television based on periods of time, selected based on a predetermined desired granularity of media content presentation information to be reported by the computing system to an audience measurement data collection facility, during which the microphone is periodical enabled, a wherein periodically obtaining the second audio signals protects privacy of household members in the media presentation environment by forgoing continuous capture of ambient audio from the media presentation environment;

determining that one of the second audio signals corresponds to the first audio signal; and based on the determining, logging the media content as presented by the television for reporting by the computing system.

16. The computing system of claim 15, wherein obtaining the first audio signal comprises obtaining the first audio signal from a tuner of the set-top box.

17. The computing system of claim 15, wherein determining that the one of the second audio signals corresponds to the first audio signal comprises determining that the one of the second audio signals is present in the first audio signal.

18. The computing system of claim 15, wherein determining that the one of the second audio signals corresponds to the first audio signal comprises determining that the one of the second audio signals and the first audio signal correspond to a same content item.

19. The computing system of claim 15, wherein logging the media content as presented by the television comprises storing media presentation information for the media content.

20. The computing system of claim 19, wherein the set of acts further comprises determining the media presentation information for the media content.

* * * * *